Aug. 23, 1932.  O. W. MOJONNIER  1,873,619
CHAIN MANUFACTURE
Filed May 2, 1930
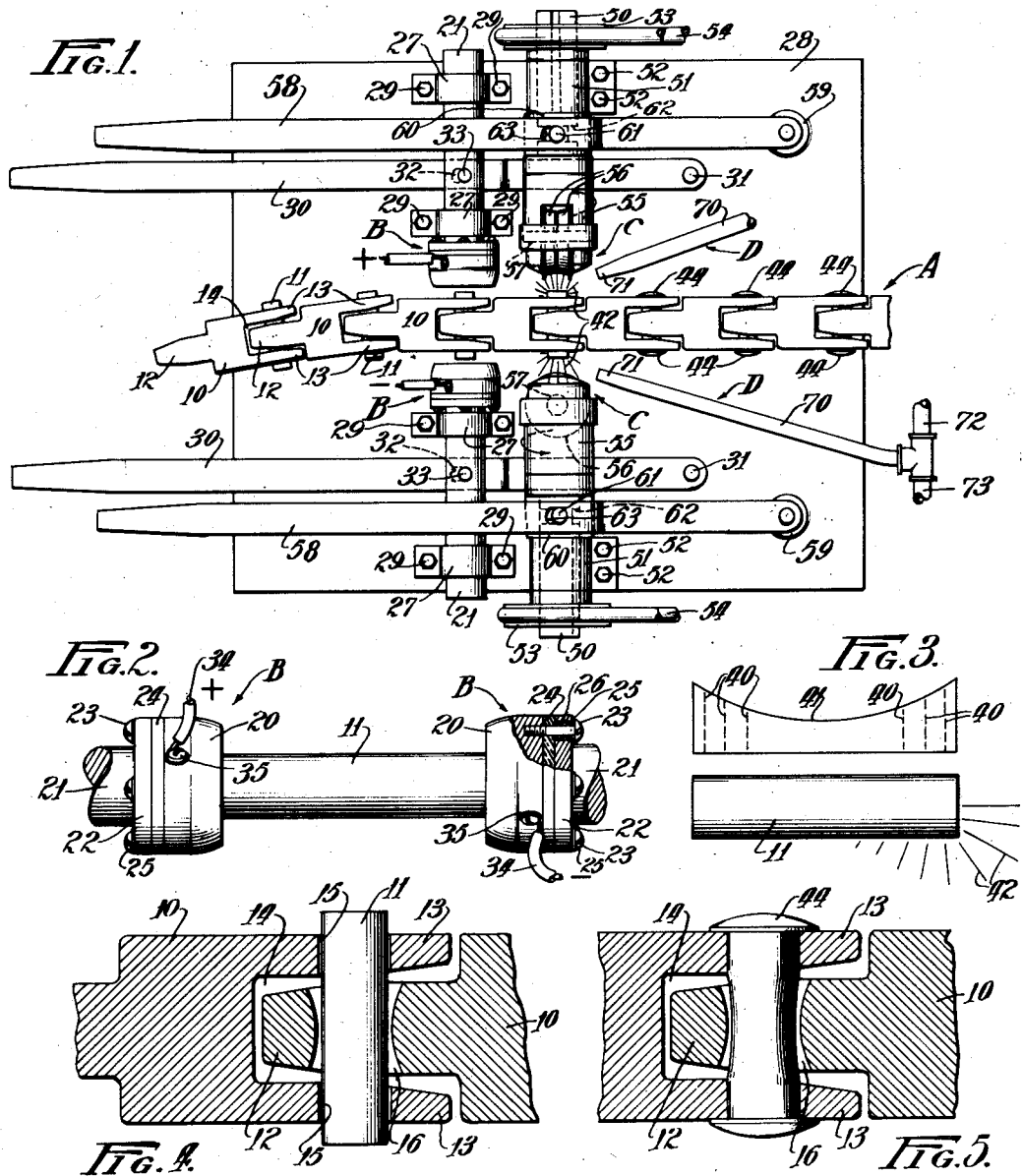

Patented Aug. 23, 1932

1,873,619

UNITED STATES PATENT OFFICE

OLIVER W. MOJONNIER, OF RIVER FOREST, ILLINOIS, ASSIGNOR TO MOJONNIER BROS. CO., A CORPORATION OF ILLINOIS

CHAIN MANUFACTURE

Application filed May 2, 1930. Serial No. 449,172.

The particular chain in connection with which the present invention was worked out and to which it is particularly applicable, includes in its structure metal links having each a central leaf-like projection or member at one end and a pair of similar outer projections or members at the other end, the latter forming between them a slot into which the central projection or member of the next link fits. These leaf-like projections have transverse openings in which the pin which pivotally connects the links is located. The pin is provided with heads which hold it in place. In the prior manufacture of chains of this class, the pivot pins as they came to the chain maker were each provided with a head at one end. When such a pin was to be placed in the chain it was first heated to riveting temperature at its unheaded end, and then while hot passed through the aligned apertures of the two links to be connected and the hot end was then immediately riveted.

The principal object of my invention is to improve on this method of manufacture in such a way as to save time in the making of the chain.

Another object is to make a stronger chain of this type than has heretofore been made.

Other objects are to provide a method of manufacture which will produce a durable and efficient chain and one wherein a pivot pin of hard material, such as tungsten or chrome steel, may be accurately positioned and firmly held in place.

These and other objects and characteristics of the invention will be apparent upon a consideration of the following detailed description taken in connection with the accompanying drawing, while the scope of the invention will be particularly pointed out in the appended claim.

In said drawing, Fig. 1 is a plan view of an apparatus by which the method of manufacture constituting the present invention may be carried out; Fig. 2 is an elevation of a pivot pin blank in position between two electrodes of a welding machine; Fig. 3 is a side elevation of the same blank shown in connection with a graph which shows by its ordinates the degree of heat present in the heated blank at different sections throughout its length; Fig. 4 is a partial sectional view illustrating a pivot pin blank in position in the aligned apertures of two associated links prior to the application of current to the pin to bring it to a welding temperature; and Fig. 5 is a similar view illustrating the pivot pin after it has been heated and its ends worked down by the riveter to form rivet heads. Throughout these views like characters refer to like parts.

Referring to the drawing in detail, A designates a chain in the manufacture of which my invention may be employed, B, B, electrical apparatus for applying heat to the pivot pins, C, C, riveting devices for use in forming heads on the pins after they have been heated, and D, D, connections for applying oil to the ends of the pins at the time they are being headed.

In manufacturing the particular chain shown, links 10 and pivot pins 11 are provided. Each link has a central leaf-like projection 12 at one end and a pair of similar outer projections 13 at the other end. The latter projections provide a slot 14 which is adapted to receive the central projection 12 of the next link. The material of the links 10 is ordinarily cast steel or malleable iron. The material of the pins 11, on the other hand, is much harder than the material of the links and is preferably chrome steel. The space 14 is in the particular construction shown, somewhat wider than the central projection 12 so that there is freedom for the chain links to move laterally so that the chain may travel around horizontal curves as indicated at the left in Fig. 1.

As shown more particularly in Figs. 4 and 5, the projections 12 and 13 are provided with openings for the passage of the pin blank 11. The openings, designated 15, which extend through the projections 13, are slightly larger than the diameter of the pin blank 11. The size of these openings need be only sufficient to allow the pin blank to be slipped in place readily. On the other hand, the opening 16 in the central projection 12 is considerably larger than the diameter of the pin blank 11 and the same is tapered inward from its outer ends so as to give rounded walls for engagement with the central portion of the pin. This loose fit between the pin and the central projection taken with the wide slot 14 and narrower projection 12 allow for the lateral curving of the chain, as before noted.

The electrical mechanism B, B consists primarily of two electrodes 20 which are mounted upon slidable rods 21 so that the electrodes may be pressed against the ends of the pin blank 11 for the purpose of heating the blank. Of course the electrodes 20 must be insulated from the supports 21 and this may be done in any desired way. In the present instance, a flange 22 on each supporting rod 20 is secured to the side of the associated electrode 20 by means of screws 23 which pass through openings in an intervening insulating web 24 and make threaded engagement with the electrode. A suitable washer 25 of insulating material and a sleeve 26 of like material insulate each screw from the flange 22. Each supporting rod 21 passes through guides 27 secured to a table or like support 28 by any suitable means such as machine screws 29. Each reciprocating bar 21 is shifted to and fro by a hand lever 30 which is pivoted at 31 to the table 28 and has a slot 32 just below the reciprocating bar in position to be engaged by a downward extending pin 33 which is driven through an opening in the bar. The pin 33 and slot 32 form a connection between the lever 30 and bar 21, which allows the necessary play between these parts. It will be apparent that when the levers 30 are drawn toward each other the electrodes 20 will be brought into contact with the ends of a properly positioned pin blank 11. The electrical connections to the electrodes may be made in any desired way and in the present instance are merely indicated by the wires 34 which are shown mechanically and electrically connected to the electrodes by screws 35.

In working upon the problem of manufacturing chain of the type shown, I found by experimentation that if a pin blank, such as the blank 11, is placed between two electrodes and current passed through it, the blank will be heated unevenly throughout its length. The ends will be much hotter than the intermediate portion. I have illustrated this in Fig. 3, where I have shown a graph directly above a pin blank. In this graph the ordinates 40 indicate roughly the intensity of the heat at the different points in the length of the blank. Thus, an ordinate at a given distance from the left end of the graph will indicate the intensity of the heat at a point in the blank the same distance from its left end. By uniting the upper ends of the ordinates 40, a curve such as 41 may be drawn. This curve indicates roughly the variation in temperature as one proceeds from point to point along the heated pin blank 11. It will, of course, be understood that this is but one way of representing in a drawing the variation in temperature in a heated blank. It will also be apparent that the graph shown, if otherwise accurate, would apply to only one heated condition of the blank. But the graph will show in general that the ends are heated much hotter than the center when the pin is held between the two electrodes and current is applied. Furthermore, the amount of heat will depend upon the length of time the blank is subjected to the current and also upon the volume of the current. Because of these factors and their variation in practice, no accurate diagram can be drawn. It must be understood, therefore, that the diagram of Fig. 3 is only in a measure suggestive and presented for the purpose of showing greater heat at the ends than at the center of the blank. The same might have been indicated by radiating lines extending from the blank and relying upon the length of the line to indicate the intensity of the heat, such as shown, for example, by the radiating lines 42 at the lower right hand portion of Fig. 3, and again by the similar lines about the ends of the heated blank in the riveting position in Fig. 1.

Having noted that a pin blank would heat in this way when placed between the electrodes of an operating electric welder, I realized that this action or phenomenon could be used to particular advantage in the manufacture of chains of the kind herein referred to. This is because the pin in the finished chain is to be loose in the hole through the central projection of one link and hence need not be heated at its center to make a connection there, while it must have heads at its ends outside of the outer projections of the companion link and so must be heated at its ends to a welding or riveting heat in order that such heads may be formed. Furthermore, if the ends of the pin are to be substantially integrally connected to the outside link projections, a construction which is preferable, then the heating of the ends will be necessary for this purpose also.

The preferred construction is shown in Fig. 5. There the portion of the blank which was least heated is the portion within the central opening 16, while the end portions which were heated to a higher temperature and positioned within the outer openings 15, 15, are shown in close and compact engagement with the material of the outer projections 13.

After a pivot pin blank 11 has been heated in the manner explained and to the temperature required, then it is passed into position to be acted upon by the riveting devices C, C. Different riveters may be employed, but whatever riveters are employed they should apply pressure to the ends of the pin blank at the same time that they are forming the heads thereon. A riveter which has been used to advantage is indicated in the drawing and comprises in each instance a rotary tool mounted upon a shaft 50. The shaft 50 is journaled in a long bearing 51 which is secured to the table 28 in any suitable way as by machine screws 52. A pulley 53 on the end of the shaft 50 is driven by a round belt 54 which is in turn driven by a suitable driving pulley. The riveting tool proper comprises a head 55 which is slotted at its end to receive two small flanged wheels 56 which are mounted to rotate on a transverse pin 57. The peripheral surfaces of the wheels 56 are such that when the two wheels press upon the end of a heated pin blank they form the curved contour of a rivet head. In order to bring the wheels 56 into engagement with the end of the pin blank, an actuating lever 58 is provided for each shaft 50. This lever is pivoted to a boss 59 upon the table 28 and passes over the shaft 50 as shown. A connection must be provided between the lever 58 and the shaft 50 whereby the shaft may be reciprocated at the same time that it is rotated. Any desired arrangement may be employed for this purpose. What is shown in the drawing is merely typical. There a sleeve 60 is provided on the shaft 50. A pin 61 extends through this sleeve and at its lower end passes into a circumferential slot 62 formed in the shaft, and at its upper end extends through a slot 63 extending lengthwise of the lever 58. With this construction the lever may be shifted to and fro and the slot 63 will prevent binding. Such shifting will cause the sleeve 60 to travel and by reason of its groove and pin connection with the shaft 50, the latter will move longitudinally with the sleeve, while it continues rotating within the sleeve 60.

In operation, a heated pivot pin blank 11 is brought into alignment with the riveters C, C and then the levers 58 are drawn toward each other and the wheels 56 of each riveter thereby brought into engagement with the heated ends of the blank. By means of the levers 58 a considerable pressure may be applied to the ends of the blank. In addition to this pressure, the shafts 50 are rotating and, consequently, the wheels 56 which rotate freely upon their pins 57, travel in opposite directions by reason of their frictional contact with the ends of the pin blank. Through the action of these parts, heads are spun or formed upon the ends of the blank 11 and a fully headed pivot 44 is produced. At the same time the heads are being formed, the pressure applied also forces the metal of the pins into intimate contact with the walls of the openings 15 and thereby establishes what is practically an integral connection with the outer link projections 13. As before stated, this intimate contact between the pin ends and the outer link projections may not be desirable. In such case, longer pins may be employed and the pressure used merely to form heads on the pins without regard to making such integral connection with the link projections. In such case the holes 15 might also be made larger in diameter.

In carrying out the riveting operation, it has been found desirable to apply oil, preferably a lubricating oil, to the ends of the heated pin blank while they are being worked upon by the riveters. Any arrangement for accomplishing this may be employed. In the present instance, the oiling connections D, D are shown as simple tubes or pipes 70 which terminate in nozzles 71 in position to direct a stream or spray of oil against the ends of the pivot blank while being acted upon by the riveters. These tubes 70 are supplied with oil from a suitable source, as through the branch pipe 72. At the same time air under pressure is applied to the tube 70, as through a pipe 73. In practice, a tube 70 of about an eighth of an inch in internal diameter with an air supply at about five pounds per square inch pressure, works very well. The amount of oil to be supplied, however, is a matter which may be varied as circumstances may require and, obviously, the same need not be applied in a spray but may be applied through wicking or by other means. The application of the oil tends to keep the riveting tools cool, as well as assisting in forming the heads upon the pins. In practice, it was found that the work was very much better when performed with the oil supplied as described. In manufacturing chain of the kind shown, the links and pins may be assembled by hand in the manner indicated at the left in Fig. 1, and then fed along step by step first to the welding electrodes and then on to the riveter, each pin in turn being heated and headed. Although the welding electrodes and the riveting tools are shown spaced apart a distance equal to the distance between adjacent pins, it will of course be noted that this is done merely for the purpose of convenience and need not be followed in carrying out the new method of manufacture. Indeed, the heating operation might occur at one point and the riveting operation at quite a different and distant point, but, obviously, it is better to have the welder and riveter located near each other somewhat after the manner shown.

What I claim as new and desire to secure by a patent of the United States is:

The method of making metal chains of links each having a central leaf-like projection at one end and a pair of similar outer projections at the other end, the latter forming between them a slot into which the central projection of the next link fits, which method consists in providing transverse openings in each pair of outer projections of the same diameter and a transverse opening in each central projection of a considerably larger diameter, selecting uniform pin blanks of a diameter to pass freely through said outer openings and of a length sufficient to provide material for heads at its ends when assembled, placing one such pin blank in each set of three cooperating openings with the ends exposed for electrode contact, bringing electrodes into contact with the ends of the several pin blanks in succession, passing an electric welding current through each pin blank when so interposed with such electrode pressure, current volume and time duration as to heat the ends of the blank to a welding heat and the middle of the blank to a less heat, and finally mechanically working the blank ends in each case to form heads and at the same time press the metal of the blank into the walls of the outer openings to form a substantially integral connection with the outer projections, whereby each pin has a fixed connection with one link and a loose connection with the next.

OLIVER W. MOJONNIER.